United States Patent [19]

Neville et al.

[11] Patent Number: 4,843,044

[45] Date of Patent: Jun. 27, 1989

[54] REFRACTORY COMPOSITION

[75] Inventors: David I. Neville, Spotswood; William E. Herberger, Freehold, both of N.J.; Dominick M. Colavito, Easton, Pa.

[73] Assignee: Quigley Company, Inc., New York, N.Y.

[21] Appl. No.: 162,768

[22] Filed: Mar. 1, 1988

[51] Int. Cl.$^4$ .............................................. C04B 35/04
[52] U.S. Cl. ...................................................... 501/111
[58] Field of Search ........................................ 501/111

[56] References Cited

U.S. PATENT DOCUMENTS

| | | | |
|---|---|---|---|
| 833,930 | 10/1906 | Jeroch . | |
| 1,916,971 | 7/1933 | Denning . | |
| 3,030,217 | 4/1962 | Chantler et al. | 106/59 |
| 3,262,793 | 7/1966 | Neely et al. | 501/111 |
| 3,304,187 | 2/1967 | Limes et al. | 501/111 |
| 3,333,972 | 8/1967 | Elmer et al. | 106/58 |
| 3,357,842 | 12/1967 | Bowman | 106/58 |
| 3,357,843 | 12/1967 | Bowman | 501/111 |
| 3,360,388 | 12/1967 | Neely | 106/60 |
| 3,490,930 | 1/1970 | Martinet | 106/58 |
| 3,540,897 | 11/1970 | Martinet | 501/111 |
| 3,879,208 | 4/1975 | Cassens | 106/58 |
| 4,244,744 | 1/1981 | Cassens | 106/58 |
| 4,463,100 | 7/1984 | Cassens | 501/108 |

Primary Examiner—Mark L. Bell
Attorney, Agent, or Firm—Peter C. Richardson; Lawrence C. Akers; Robert F. Sheyka

[57] ABSTRACT

A refractory composition is disclosed which contains from about 0.5 to about 0.5% of an alkali metal phosphate, for example, monosodium phosphate, from about 1.7 to about 5% of an alkali metal polyphosphate, from about 0.1 to about 0.35% of a lime aggregate; from about 0.1 to about 1.5% of a plasticizer, with the balance being a sized refractory aggregate, preferably an MgO-containing grain such as periclase.

8 Claims, No Drawings

REFRACTORY COMPOSITION

BACKGROUND OF THE INVENTION

This invention pertains to refractory composition. More particularly, the present invention relates to a refractory composition suitable for gunning, ramming or casting a monolithic structure.

When refractory mixes, particularly those for gunning, were first developed, the practice was to use conventional refractory bonds such as sodium silicate or magnesium sulfate, as the bonding agent. While useful for their intended purpose, these mixes did not always exhibit maximum performance characteristics. For instance, if these mixes containing conventional bonding systems are used for gunning, there may arise some shortcomings since gunning mixes must mix readily with water, adhere well to a furnace wall without slumping or rebounding and must set to a coherent mass very rapidly. If these mixes containing conventional bonding systems are used for casting or ramming, they also may function well but increased performance is always desirable.

Accordingly, special bonding systems have been developed.

U.S. Pat. No. 3,357,842 discloses a bonding system using monosodium phosphate.

U.S. Pat. No. 3,357,843 discloses a bonding system using glassy polyphosphates, particularly sodium tripolyphosphate.

U.S. Pat. No. 3,879,208 discloses a bonding system using aluminum sulfate.

U.S. Pat. No. 4,463,100 discloses a refractory composition containing a stabilized lime aggregate wherein dicalcium silicate is the major crystalline phase in the aggregate.

U.S. Pat. No. 2,619,426 discloses a refractory composition suitable for ramming, casting, or pressing, or for use as a mortar, and bonded with a combination of aluminum sulfate and calcium phosphate.

U.S. Pat. No. 4,276,901 discloses a refractory composition containing from 0.5 to 5% bentonite; from 1.5 to 10% of a bonding system consisting of from 1 to 5% alkali metal phosphates and from 0.5 to 5% aluminum sulfate; and up to 10% pitch.

U.S. Pat. No. 3,490,930 discloses a refractory composition consisting of refractory grain selected from the group consisting of magnesia, chromite, and admixtures of magnesia and chromite with each other; a bonding agent consisting of 1% to 5% of a hydrated alkali metal borate; and a plasticizer consisting of 1% to 5% of a plastic swelling clay.

SUMMARY OF THE INVENTION

The present invention is directed to a refractory composition consisting essentially of sized refractory aggregate including at least 10%, based on the weight of the total composition, MgO-containing grain having at least 50% MgO and passing a 5 mesh screen; from about 0.05 to about 0.5% of an alkali metal phosphate; from about 1.7 to about 5% of an alkali metal polyphosphate; from about 0.1 to about 0.35% of a lime aggregate; and from about 0.1 to about 1.5% of a plasticizer.

A preferred embodiment is one wherein the MgO-containing grain contains about 90% MgO.

Another preferred embodiment is one wherein the refractory aggregate is all grain containing at least 85% MgO.

A especially preferred embodiment is one wherein the alkali metal phosphate is monosodium phosphate and the alkali metal polyphosphate is sodium hexametaphosphate.

An embodiment also preferred is one wherein the plasticizer is bentonite.

In a further preferred embodiment, the refractory aggregate comprises at least 95% by weight of the total composition.

In another preferred embodiment, the lime aggregate contains at least 90% CaO and passes a 30 mesh screen.

DETAILED DESCRIPTION OF THE INVENTION

The refractory aggregate used in the present invention can be any such material, but preferably will be a nonacid aggregate such as periclase or periclase and chrome ore. In a particularly preferred embodiment of the invention, the refractory aggregate is all periclase containing at least 85%, and preferably about 90% or more MgO. The aggregate is sized according to principles well known in the industry to achieve maximum density, ranging in size from, for example, material just passing a 5 mesh screen down to material passing a 325 mesh screen.

The refractory aggregate can also be deadburned magnesite. Both periclase, deadburned magnesite, and other refractory aggregates are commercially available or may be obtained by processes well known by those in the art to which this invention pertains.

The alkali metal phosphate used in the present invention is preferably monosodium phosphate. ($NaH_2PO_4$, (MSP)). Other alkali metal phosphates, such as potassium phosphate, may also be used. Preferably, the alkali metal phosphate is used as a powder sized such that virtually all passes through a 50 mesh screen.

The alkali metal polyphosphate used in the present invention is preferably sodium hexametaphosphate. Other polyphosphates such as sodium tripolyphosphate, potassium hexametaphosphate, potassium tripolyphosphate, etc. may also be used. The alkali metal polyphosphate is used as a powder sized so that virtually all passes through a 50 mesh screen.

The lime aggregate used in the present invention is one which contains at least 90% CaO. The lime aggregate is used in the form of fine powder sized so that virtually all passes through a 30 mesh screen.

The plasticizer employed in the present invention is preferably bentonite. Other plastic montmorillonite type swelling clays may also be used. Other organic or inorganic plasticizers may also be used. If bentonite is used, it will be used in the form of a powder sized so that virtually all passes through a 50 mesh screen.

The various ingredients will be admixed by the refractories manufacturer and shipped to the customer, for example in bags containing 25 or 50 kg (50 or 100 pound sacks) or even larger containers. The user, if the mix is to be used for gunning, will place the composition in a refractory gun or similar apparatus and use it to repair or maintain a furnace lining by gunning it onto the surface of the lining, either while it is still hot, or after it has cooled down, as is well known in this art.

If the compositions of the present invention are used as ramming mix compositions, the components can be mixed together and water added for immediate use or the dry mixture can be stored or shipped. If a dry ramming mix is used, it can be thoroughly mixed with 3-6 lbs of water per 100 lbs of dry ramming mix composition to form a wetted mixture, and then the material may be formed by ramming in any manner known in the art.

When the compositions of the present invention are used in casting processes, the refractory concrete will contain from 10% to about 60%, preferably 30%, of the composition of the present invention. The amount of water employed in forming or in casting the mix is that which is sufficient to temper or to impart plasticity thereto, according to practices well known in the art to which this invention pertains. In general, in making cast concretes using a coarse aggregate, there is employed from 4% to 15% water; in making castings employing finer grained aggregate, for instance in slip casting, much higher amounts of water, e.g. 35% to 40% or more, are employed; and in making pressed shapes, such as brick, there is employed from 1% to 7% or more of water. The percent of water is calculated based on the dry solids.

Having described the invention in general terms, reference is now made to specific examples. It is to be understood that these examples are not to be construed as limiting the invention, the scope of which is determined by the appended claims.

EXAMPLE 1

This example sets forth a composition showing parts by weight of the ingredients.

| Component | % |
| --- | --- |
| Sized Magnesia | 96.05 |
| Bentonite | 1.0 |
| High Calcium Pulverized Lime | 0.2 |
| Sodium Hexametaphosphate (SHMP) | 2.5 |
| Monosodium Phosphate (MSP) | 0.25 |

TABLE 1

Testing of refractory compositions.

| Fired to (°F.) | Density (lbs/cu ft) | Linear Change % | Cold Modulus of Rupture (psi) | Cold Crushing Strength (psi) |
| --- | --- | --- | --- | --- |
| 230 | 158-166 | 0.0 | 107-242 | 2808-4183 |
| 500 | 159-164 | 0.0-(−)0.1 | 145-285 | 2299-4451 |
| 1000 | 159-163 | 0.0-(−)0.1 | 168-268 | 1781-2488 |
| 1500 | 157-162 | 0.0-(−)0.1 | 193-361 | 1334-2085 |
| 2000 | 162-163 | 0.0-(−)0.1 | 795-942 | 2124-4040 |
| 2500 | 163-177 | (−)0.4-(−)0.8 | 1824-1894 | 6109-7537 |

The sized magnesia used was periclase having the following elemental analysis:

| | (%) |
| --- | --- |
| MgO | 92 |
| CaO | 2.23 |
| $SiO_2$ | 2.23 |
| $Al_2O_3$ | 0.56 |
| $Fe_2O_3$ | 2.75 |
| $B_2O_3$ | 0.23 |

The lime aggregate used was high CaO lime having the following analysis:

| | (%) |
| --- | --- |
| CaO | 96.07 |
| MgO | 0.69 |
| $SiO_2$ insolubles | 1.40 |
| $SiO_2$ | 1.12 |
| $R_2O_3$ | 1.21 |
| $Fe_2O_3$ | 0.294 |
| $Al_2O_3$ | 0.916 |
| Sulfur | 0.014 |
| Loss on Ignition | 0.66 |
| Available CaO | 94.1 |
| Basicity factor | 0.97 |

Physical testing of the lime aggregate was as follows:

| Fineness % passing (U.S. Standard Sieve Series) | |
| --- | --- |
| ¼ | |
| #20 | |
| #30 | 100 |
| #80 | 100 |
| #100 | 99.8 |
| #200 | 94.1 |
| #325 | |
| Bulk Density-lb/cu/ft | |
| Loose | 42.1 |
| Patched | 72.1 |
| Surface Area | 8.325 |
| Surface Area ($cm^2/gm$) | 8.325 |
| Avg. Particle Dia (microns) | 2.24 |
| Density ($g/cm^3$) | 3.25 |

We claim:

1. A refractory composition consisting essentially of: from about 0.05 to about 0.5% by weight of an alkali metal phosphate; from about 1.7 to about 5% by weight of an alkali metal polyphosphate; from about 0.1 to about 0.35% by weight of a lime aggregate having at least 90% available CaO and passing a 30 mesh screen; from about 0.1 to about 1.5% by weight of a plasticizer; with the balance being sized refractory aggregate, wherein at least 10% of said refractory aggregate is MgO-containing grain having at least 50% MgO and passing a five mesh screen, all percentages by weight being based on the weight of the total refractory composition.

2. A composition according to claim 1 wherein the MgO containing grain contains about 90% MgO.

3. A composition according to claim 1 wherein the refractory aggregate is all grain containing at least 85% MgO.

4. A composition according to claim 1 wherein the alkali metal phosphate is monosodium phosphate.

5. A composition according to claim 1 wherein the alkali metal polyphosphate is sodium hexametaphosphate.

6. A composition according to claim 1 wherein the plasticizer is bentonite.

7. A composition according to claim 1 wherein the refractory aggregate comprises at least 95% by weight of the total composition.

8. A composition according to claim 1 wherein the refractory aggregate comprises from about 80 to about 85% of the total composition.

* * * * *